United States Patent [19]
Ishiharada et al.

[11] Patent Number: 6,104,857
[45] Date of Patent: Aug. 15, 2000

[54] LINE GLOWER

[75] Inventors: Minoru Ishiharada, Saitama-ken; Hideo Sugiyama; Tatsuo Terahama, both of Tokyo, all of Japan

[73] Assignee: Bridgestone Corporation, Tokyo, Japan

[21] Appl. No.: 09/137,175

[22] Filed: Aug. 20, 1998

[30] Foreign Application Priority Data

Aug. 22, 1997 [JP] Japan .................................. 9-241892

[51] Int. Cl.[7] ........................................................ G02B 6/00
[52] U.S. Cl. ........................... 385/147; 901/123; 901/141
[58] Field of Search ........................... 385/147, 123–128, 385/129–133, 901, 141; 362/582, 253, 296, 458

[56] References Cited

U.S. PATENT DOCUMENTS

| | | | |
|---|---|---|---|
| 4,422,719 | 12/1983 | Orcutt | 385/123 |
| 4,666,640 | 5/1987 | Neefe | 264/2.1 |
| 4,733,332 | 3/1988 | Yamashita et al. | 362/582 |

FOREIGN PATENT DOCUMENTS

| | | |
|---|---|---|
| 0800036 | 10/1997 | European Pat. Off. . |
| WO98/20279 | 5/1998 | WIPO . |

*Primary Examiner*—Phan T. H. Palmer
*Attorney, Agent, or Firm*—Jordan and Hamburg LLP

[57] ABSTRACT

A line glower usable in water, rain, snow or in a place where an explosion may possibly take place, and adapted to work with a small power to emit light from the lateral side thereof. It comprises a light transmission tube including a transparent core and a clad having a smaller refractive index than the core; a water-proof light source disposed at at least one axial end of the light transmission tube; and a drive unit to turn on and off the light source; the light emitted from the light source and incident upon an end of the light transmission tube being let to go out from a lateral side of the tube.

9 Claims, 9 Drawing Sheets

LINE GLOWER

BACKGROUND OF THE INVENTION

1. Field of the Invention

The present invention relates to a highly water-resistant, environmentally friendly, low power-consumption line glower adapted to be driven with a small power.

2. Description of Related Art

Conventionally, a neon tube, fluorescent tube, etc. are used as a line glower or light emitter which can provide a linear light source extending over a distance of several meters.

However, the neon tube or fluorescent tube needs a high voltage, and it may possibly cause an electric shock or a current is likely to leak from it. Therefore, it cannot be used in water, rain or snow. Further, since it is formed from a glass tube, it may not be used in a place where it will possibly be broken by collision with a person, car or the like. The glass tube is very fragile.

For a circular shape, the glass tube has to be elaborately bent or curved in conformity to the curvature of the circle. The glass tube bending or curving cannot be easily done but needs a high skill and many experiences. This will increase the manufacturing costs. Furthermore, the neon tube or fluorescent tube consumes a power as large as several tens W per unit length of 1 m. For a long use, a commercial power supply has to be available in a place not far from the neon tube or fluorescent tube.

To solve all the above problems, there have been proposed a light transmission tube comprising a flexible tube and a transparent core solution or soft transparent polymer filled in the tube, and a braided plastic optical fiber product.

Briefly speaking, a light generated from a source is admitted into a light transmission tube at one end thereof and let to go out from the lateral side of the tube along a length of several tens meters. Since the light source and glowing portion can thus be separated from each other, the light transmission tube can be used in water, outdoors or in a place where an explosion may possibly take place. Further, the tube will not possibly be easily broken. Different from the glass tubes such as neon tube, fluorescent tube, etc., it needs no troublesome, elaborate working but can be easily worked.

However, when such a conventional light transmission tube is used to emit light from the lateral side thereof along a length of several tens meters, its luminous efficiency is low. For an increased intensity of light, a light source capable of providing an output ranging from 50 to 250 W is required for use with the light transmission tube. Also, when the light source and light transmission tube are used in water, outdoors or in a place where an explosion may possibly take place, the light source should be protected, which will cause the light source itself to have so large a volume as needs a wide space for storage.

SUMMARY OF THE PRESENT INVENTION

Accordingly, the present invention has an object to overcome the above-mentioned drawbacks of the prior art by providing a line glower usable without any problem in water, rain, snow or in a place where an explosion may possibly take place, adapted to provide a sufficient illumination from the lateral side thereof even with a small power and designed very compact for storage in a limited space.

The above object can be accomplished by providing a line glower comprising, according to the present invention, a light transmission tube including a transparent core and a clad having a smaller refractive index than the core; a water-proof light source disposed at at least one axial end of the light transmission tube; and a drive unit to turn on and off the light source; the light emitted from the light source and incident upon an end of the light transmission tube being let to go out from a lateral side of the tube.

According to another aspect of the present invention, the light transmission tube further includes a band-shaped light reflective layer disposed between the clad and core along the length of the clad.

BRIEF DESCRIPTION OF THE DRAWINGS

These objects and other objects, features, aspects and advantages of the present invention will become more apparent from the following detailed description of the present invention when taken in conjunction with the accompanying drawings, of which.

DETAILED DESCRIPTION OF THE PREFERRED EMBODIMENTS

Figure 1:
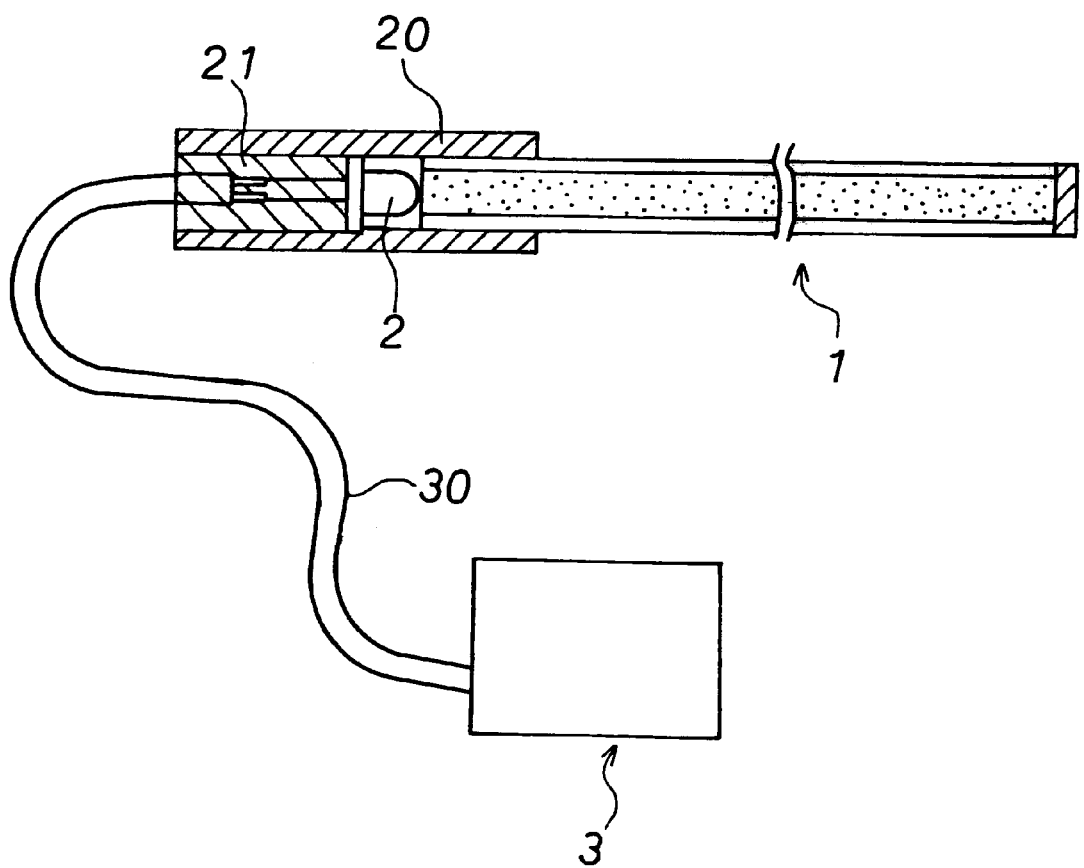
FIG. 1 schematically illustrates the construction of the line glower according to the present invention.
Figure 2:
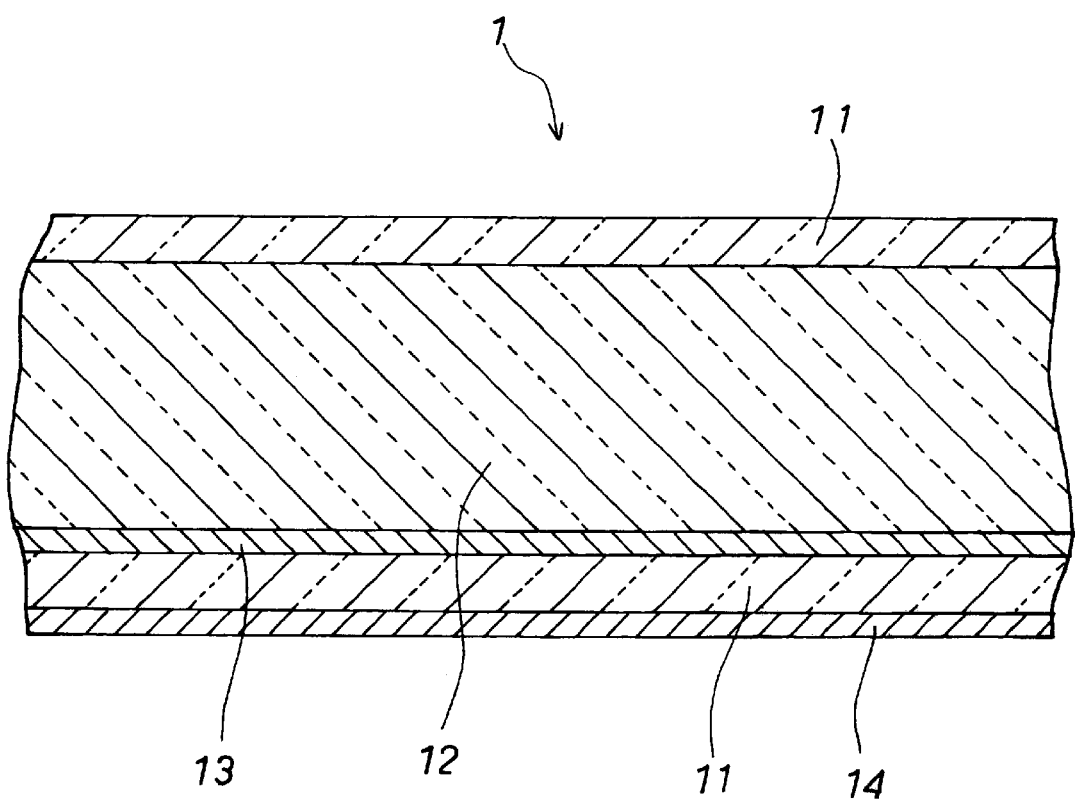
FIG. 2 is an axial-sectional view of the light transmission tube.

As schematically shown in FIG. 1, the line glower according to the present invention comprises a light transmission tube 1 having a light reflective layer 13 disposed therein, light source 2 and drive unit 3 as main components.

The light transmission tube 1 includes a transparent tubular clad 11, transparent core 12 having a larger refractive index than the clad 11, and the light reflective layer 13 disposed between the core 12 and the inner wall of the clad 11 (this side of the clad will be referred to as "rear side" hereafter) opposite to a side from which the light is to be let out (this side of the clad will be referred to as "front side" hereafter). The light transmission tube 1 further comprises a light-reflecting protective layer 14 formed on the rear side of the clad 11 to cover the light reflective layer 13 and complement the light reflective layer 13.

Note that the diameter and length of the core 12 in the light transmission tube 1 are not limited to any special values, but when one LED is used as the light source 2, for example, the core diameter should be about 2 to 30 mm, preferably be 4 to 15 mm and the core length be about 0.1 to 5 m, preferably 0.2 to 2 m.

Also note that the light reflective layer 13 may be formed like a band along the length of the clad in a position somewhat inwardly off the core surface.

The tubular clad 11 should preferably made of a flexible material moldable into a tube form and having a small refractive index such as plastic, elastomer or the like. More particularly, it should be made of a material selected from polyethylene, polypropylene, polyamide, polystyrene, ABS resin, polymethyl methacrylate, polycarbonate, polyvinyl chloride, polyvinylidene chloride, polyvinyl acetate, polyethylene-vinyl acetate copolymer, polyvinyl alcohol, polyethylene-polyvinyl alcohol copolymer, fluorocarbon resin, silicone resin, natural rubber, polyisoprene rubber, polybutadiene rubber, styrene-butadiene copolymer, butyl rubber, butyl rubber halide, chloroprene rubber, acryl rubber, EPDM, acrylonitrile-butadiene copolymer, fluorocarbon rubber, silicone rubber, etc.

Among these materials, a silicone polymer or fluorocarbon polymer having a smaller refractive index should preferably be selected for making the clad 11. More particularly, the more preferable materials for the clad 11 include silicone polymers such as polydimethyl siloxane polymer, polymethyl phenyl siloxane polymer, fluorosilicone polymer and the like, polytetrafluoroethylene (PTFE), fluorinated ethylene propylene copolymer (FEP), perfluoroalcoxyethylene copolymer (PFE), polychlorotrifluoroethylene (PCTFE), ethylene tetrafluoroethylene copolymer (ETFE), polyvinylidene fluoride, polyvinyl fluoride, vinylidene fluoride-ethylene chloride trifluoride copolymer, vinylidene fluoride-propylene hexafluoride copolymer, vinylidene fluoride-propylene hexafluoride-ethylene tetrafluoride copolymer, ethylene tetrafluoride propylene rubber, fluorinated thermoplastic elastomer, etc. Among others, a fluorinated polymer should preferably be used to make the clad 11. One of these materials may be used or two or more may also be used as blended.

On the other hand, the transparent core 12 should be made of a solid material such as methacrylated polymer, polycarbonate, polystyrene, silicone rubber, ethylidene norbornen polymer, SBS, SIS, SEBS (styrene-ethylene-butadiene-styrene block polymer) or the like. Among others, the methacyrylated polymer should preferably be used to make the core 12.

The methacryl polymers for use to make the core 12 includes homopolymers derived from polymerization of one monomer selected from acryl, methacryl and esters of them with monatomic alcohols, or copolymers derived from copolymerization of two or more monomers. The monatomic alcohols include ones with one to 22 carbons. Among others, a monomer selected from among acryl, methacryl and esters of them with lower alcohols (with one to 5 carbons, preferably one to 3 carbons, most preferably one carbon) or a copolymer of them with a monomer represented by the following usual formula (1) should preferably be used since they have an excellent flexibility and light permeability.

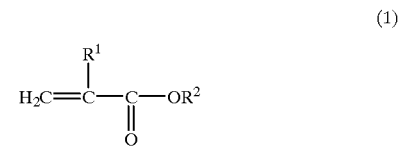

(1)

where $R^1$ is a hydrogen atom or methyl group, $R^2$ is an alkyl group with a number of carbons from 8 to 20, preferably 10 to 16, more particularly 12 to 14. The higher alkyl groups may be either homoalkyl group or mixed alkyl group, and it should more preferably be an alkyl group with 12 carbons and a mixed alkyl group with 13 carbons. The ratio between the alkyl group with 12 carbons and that with 13 carbons should usually be 20:80 to 80:20, more particularly 40:60 to 60:40. The ratio of copolymerization between a monomer selected from the acryl, methacryl and lower alcohol esters of them and the monomer represented by the above formula (1) should appropriately be selected to be 5:95 to 79:21, more preferably 30:70 to 65:35.

Note that the diameter of the core 12 is not limited to any special value, but it should be 2 to 30 mm, preferably be 5 to 15 mm.

The light reflective layer 13 should preferably be formed from light-scattering particles. The light-scattering particles for use to form the light reflective layer 13 includes organic polymer particles such as silicone resin particles, polystyrene resin particles, etc., metal oxide particles such as $Al_2O_3$, $TiO_2$, $SiO_2$, etc., sulfate particles such as $BaSO_4$, etc., carbonate particles such as $CaCO_3$, etc. One of the above-mentioned particles may singly be used, or two or more of them may be used in conjunction, to form the light reflective layer 13.

The mean particle size of them should be 0.1 to 30 m, preferably 1 to 15 m. If the mean particle size exceeds 30 m, the particles will readily precipitate in a core solution being injected into the clad tube 11 in the process of forming the light transmission tube 1 as will be described later. The ready precipitation of the particles will be inconvenient for the formation of the light transmission tube 1.

The thickness of the light reflective layer 13 is not limited to any special value, but should be 10 to 200 m, preferably 50 to 100 m. If the layer thickness is too small, the light will be less reflected and thus the intensity of light will be lower. On the contrary, if the light reflective layer 13 is too thick, the light will be much reflected and the intensity of light be higher, which however is true for a portion of the layer 13 near to the light source while the light intensity will be lower at a portion of the layer 13 farther from the light source.

The light-reflecting protective layer 14 may be a layer which will prevent a light, leaked from the light reflective layer 13, from outgoing through the layer. The layer should preferably be a one which will not absorb the leakage light but reflect it. More particularly, the layer 14 may be a foil of a metal such as silver, aluminum or the like, a metal sheet, reflective sheet, metal-evaporated sheet or the like, or a sheet on which light-scattering particles like the above-mentioned one are applied.

Figure 3:
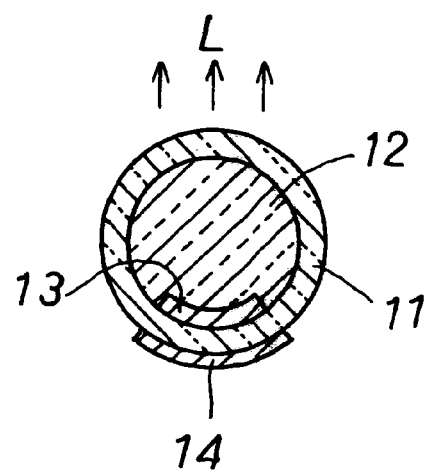
FIG. 3 is a cross-sectional view of the light transmission tube.
Figure 4:
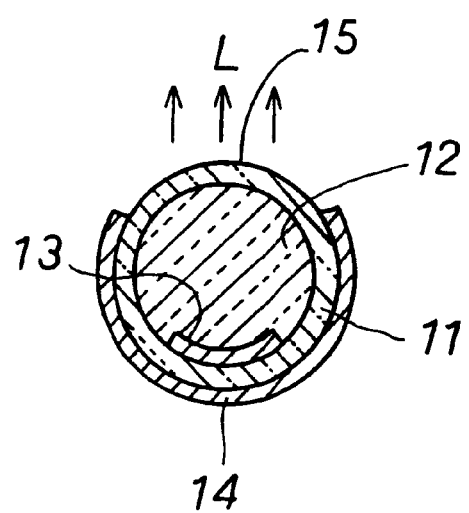
FIG. 4 is a cross-sectional view of a variant of the light transmission tube.

The light-reflecting protective layer 14 may be formed on the outer surface of the clad 11 to cover just the light reflective layer 13 as shown in FIG. 3. Alternatively, it may be formed on the outer surface of the clad 11 and extended so much beyond the light reflective layer 13 toward the front side of the clad 11 as to have a light emission window 15 as shown in FIG. 4. The light emission window 15 is a portion of the clad 11 which remains not covered with the light-reflecting protective layer 14.

In forming the light transmission tube 1, the above-mentioned light-scattering particles are dispersed in the core solution containing the above-described monomer, the solution is put into a clad tube which becomes the clad 11, the clad tube is closed at opposite ends thereof and placed horizontally for about 30 to 48 minutes to allow the dispersed light-scattering particles to settle down onto the bottom of the clad tube. To settle down the light-scattering particles, centrifugation may be applied as the case may be. Thereafter, the monomer contained the core solution is polymerized and hardened. Thus, the light reflective layer 13 formed from the light-scattering particles is formed between the clad 11 and core 12, or in a position somewhat inwardly off the outer surface of the core 12.

The monomer polymerization is not limited to any special method. The monomer may be polymerized by the conventional method in which an organic peroxide such as t-butyl hydroperoxide, di-t-butyl peroxide, rauloyl peroxide, benzoyl peroxide, dimilistyle peroxydicarbonate, t-butyl peroxyacetate, t-butyl peroxy(2-ethylhexanoate) or the like, and a polymerization initiator such as an azo-compound such as cumilperoxioctoate, azobisisobutyronitrile, azobiscyclohexanenitrile or the like, are incorporated into the monomer and polymerized at 50 to 120° C. for 1 to 20 hours. For this polymerization, it is recommendable to polymerize the monomer while pressurizing the core solution from one end or both ends of the clad tube since the pressurization will not prevent air bubbles from taking place in the core.

The light source 2 is disposed at at least one axial end of the light transmission tube 1 (at the left end in this embodiment). It uses an LED (light emitting diode). There are available of LEDs which provide red, blue, green, yellow, orange, white rays of light, one of which may be selected appropriately for an intended purpose of the line glower. One LED may be used as the light source 2 or a plurality of LEDs may be used together for an increased quantity of light. The light from the light source 2 may be admitted into the light transmission tube 1 at one end or opposite ends thereof. By admission of light at opposite ends of the light transmission tube 1, the illumination from the light transmission tube 1 can be more uniform and of a higher intensity. As the light source 2, a single LED of a color or two or more LEDs of different colors may be used. In case the line glower is used as a go-stop control sign along a stop-line at a railway crossing, for example, two LEDs one of which emits yellow light while the other emits red light may be used. Normally or while no train is approaching the railway crossing, the yellow LED is used to emit yellow light from the line glower, thereby notifying walkers and car drivers that the site is a railway crossing and that they can cross the railway. Just before a train passes, or while the train is passing, by the crossing, the LED of yellow light is turned off and the LED of red color is turned on to emit red light from the line glower to warn the walkers and car drivers waiting until the train goes away. The drive unit 3 may be adapted to illuminate the LEDs continuously or intermittently.

The light transmission tube 1 is securely fixed at one end thereof with a joint member 20 by bonding or caulking. Also the LED light source 2 is integrally fixed to the light transmission tube 1 by means of the joint member 20.

Note that the light source 2 and drive unit 3 are connected to each other with a rubber-, vinyl- or polyethylene-sheathed interconnecting cord 30. The joint member 20 is filled with a potting material 21 such as epoxy resin, silicone rubber or the like in order to insulate the connection between the interconnecting cord 30 and light source 2 and also to prevent water, steam, combustible gas or liquid from penetrating into the joint member 20. Note that the interconnecting cord 30 may be protected or water-proofed by passing it through a flexible pipe made from a metal or resin, or a rubber or plastic pipe.

Figure 5:
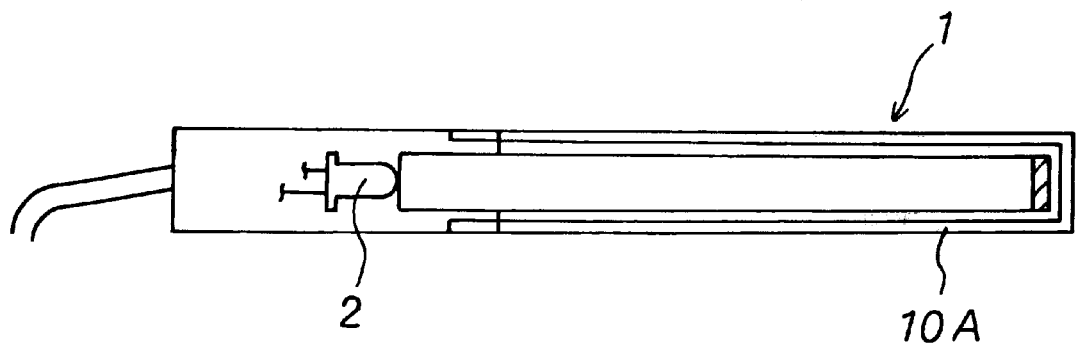
FIG. 5 is an explanatory drawing of another variant of the light transmission tube.
Figure 6:
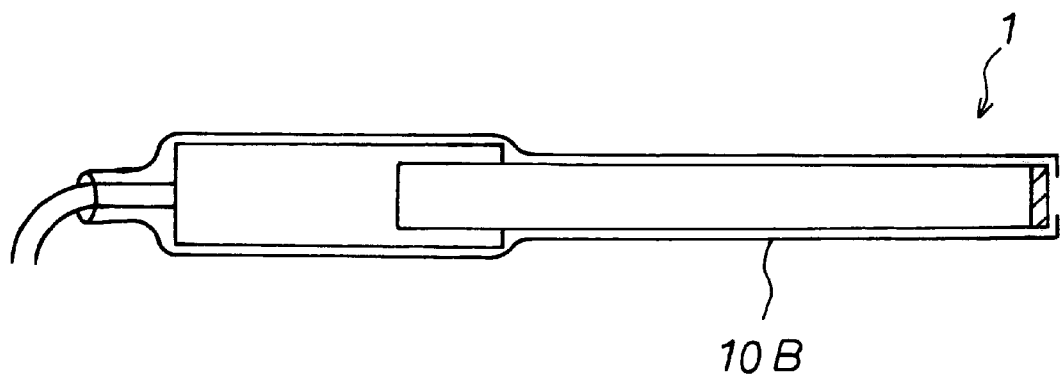
FIG. 6 is an explanatory drawing of still another variant of the light transmission tube.

Furthermore, the light transmission tube 1 may be inserted into a transparent pipe 10A or the like as shown in FIG. 5 to protect the tube 1, or into a transparent heat-contractible tube 10B as shown in FIG. 6 to protect the tube 1 and seal the whole line glower.

Figure 7:
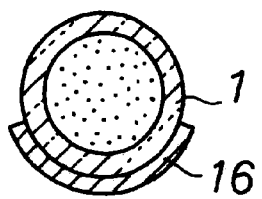
FIG. 7 is a cross-sectional view of the light transmission tube on which a light-reflecting protective layer is attached.
Figure 8:
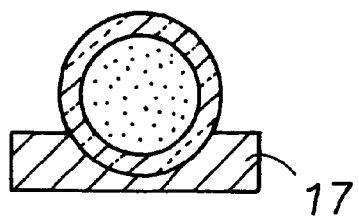
FIG. 8 is a cross-sectional view of the light transmission tube secured to a channel.
Figure 9:
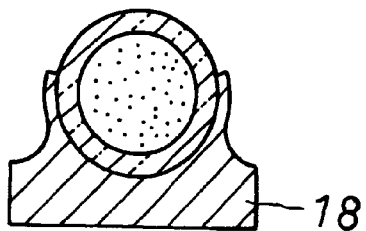
FIG. 9 is a cross-sectional view of the light transmission tube secured to another channel.

Moreover, the light transmission tube 1 may be provided on a part of the outer surface thereof, as shown in FIG. 7, with a further light reflective layer 16 formed from a reflective tape on which a metal such as stainless steel, gold or silver is evaporated, sputtered or plated, a coating of a reflective paint, a metal foil or a vinyl tape on which reflective particles such as titanium oxide is applied or which contains a pigment. Also, the light transmission tube 1 may be provided with a fixing channel 17 or 18 which reflects light (namely, serving also as a light-reflecting protective layer) as shown in FIG. 8 or 9. The channel may be formed from a metal material such as aluminum, stainless steel or the like, or from a plastic or elastomer in which highly light-reflective fine particles (powder) are incorporated and kneaded.

The drive unit 3 is provided to supply the light source 2 with a power. It has an electric circuit (comprising a resistor, transistor, constant-current diode, etc.) fed from a power source such as a battery, solar battery, DC/AC source or the like to energize the LED or LEDs. Note that a solar battery or a secondary source (storage battery) may be incorporated in the drive unit 3 itself or provided separately from the drive unit 3. The drive unit 3 has an interconnecting cord 30 of which the leading portion is appropriately sealed for a sufficient water-proofing.

Next, some embodiments (experiments 1 and 2) of the line glower of the present invention will be described in comparison with a comparative example.

Embodiment 1:

A monomer solution (core solution of 0.92 in specific gravity) was prepared from MMA (methyl methacrylate) in 60 parts by weight, LMA (lauryl methacrylate) in 40 parts by weight, BPO (benzoyl peroxide) in 0.05 parts by weight. Silicon resin particles (by Toshiba Silicone) of 12 m in a mean particle size and 1.32 in specific gravity, as light-scattering particles, were dispersed into the monomer solution at a ratio of 0.15 parts by weight to 100 parts by weight. An FEP tube of 6 mm in outside diameter, 5 mm in inside diameter and 1.5 m in length was prepared and charged with the monomer solution, and sealed at opposite ends thereof. The FEP tube was left horizontally for 2 hours to allow the silicone resin particles to settle down to the bottom of the FEP tube. After lapse of the two hours, the FEP tube was put into a hot water bath at a temperature of 65° C. with care not to disturb the settled silicone resin particles. While the FEP tube was being applied at the opposite ends thereof with a pressure of 3.5 kg/cm$^2$, the monomer solution was polymerized and hardened for 3 hours.

The light transmission tube thus produced had a light reflective layer of the above-mentioned silicone resin particles formed on the core surface in a band-like shape along the length of the tube.

A piece of 30 cm in length was cut from the light transmission tube thus formed. A mirror-finished stainless steel sheet of 1 mm in thickness and 6 mm in outside diameter was bonded as a reflective plate to one end face of the light transmission tube piece with a transparent epoxy adhesive. An aluminum joint was used to connect a green LED (NSPG50 by Nichia Chemicals) to the other end face of the tube piece. Lead wires were soldered to the terminals of the LED. The exposed portions of the lead wires were sealed each with a silicone adhesive. Thus a line glower was completed.

The intensity of light from the front side of the tube piece when a current of 20 mA was supplied to the LED is shown in Table 1.

TABLE 1

Light intensity at tube front side (in $cd/m^2$)

| | Measuring points (distance from light-incident end of tube) | | |
|---|---|---|---|
| | 50 mm | 150 mm | 250 mm |
| Embodiment 1 | 120 | 100 | 100 |
| Embodiment 2 | 200 | 180 | 175 |
| Comparative example | 20 | 10 | 10 |

As seen from Table 1, the intensity of light obtained with the embodiment 1 is higher than that with the comparative example. The power consumption of the LED was 0.06 W.

The above test piece was left immersed in water for 6 months and then tested. The test results showed no problems such as leakage current and proved the same intensity of light from the test piece as in the above.

Embodiment 2:

In this embodiment, a highly reflective resin (VANLIGHT LD-1000R by Teijin) were used to form a channel 17 (or 18) as in FIG. 8 (or 9). The light transmission tube test piece as in the embodiment 1 was fitted in the channel 17 (or 18). Thus the channel itself has a light reflectivity.

The comparative example used for comparison with the embodiment 2 was formed in the same manner as the one used for comparison with the embodiment 1 except that no light-scattering particles are incorporated therein.

The embodiment 2 and comparative example were measured concerning intensity of light from the front side of the light transmission tube at points predetermined distances away from the light-incident end of the light transmission tube. The results are shown in Table 1.

As seen from Table 1, the intensity of light at the front side of the embodiment 2 fitted in the channel which is light-reflective itself is the highest, that of the embodiment 1 having the light reflective layer 13 is the second highest, and that of the comparative example having neither the light reflective layer 13 nor light-reflecting protective layer 14 is the lowest.

Figure 10:
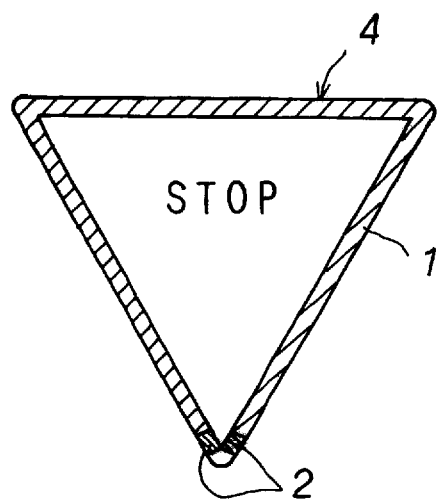
FIG. 10 is an explanatory drawing of the light transmission tube used on a traffic control sign.

Next, applications of the line glower of the present invention will be described herebelow:

A traffic control sign 4 can be edged with the light transmission tube 1 of the line glower for contribution to a traffic control at night, for example, as shown in FIG. 10.

Figure 11:
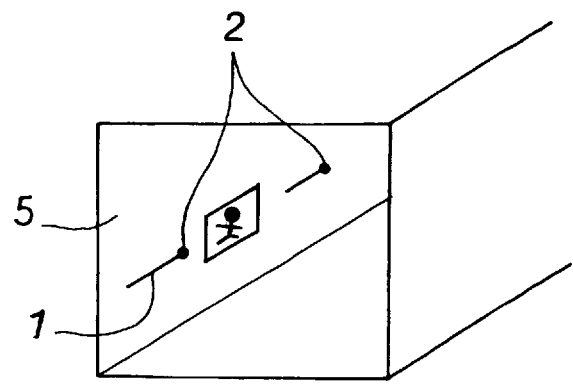
FIG. 11 is an explanatory drawing of the light transmission tube used in a guide way.

As shown in FIG. 11, the light transmission tube 1 can be installed on a side wall of a tunnel (in addition, underpass, passageway in an office or hospital building, evacuation guideway in a picture theater, public hall, etc.) to provide a guidance for direction, etc. In this case, the line glower may be supplied with a power in a two way, namely, from a commercial power source for driving the light source, and from a battery as a standby power source at a power failure. Generally, a battery can energize an incandescent lamp or fluorescent lamp for about several tens minutes. According to the present invention, however, an LED or LEDs are used in place of such lamps. The battery can energize it for a longer time. The linear illumination provided by the line glower will permit a ready visual acknowledgment of such a guideway, thus the line glower can provide a smooth guidance to a safe place.

Figure 12:
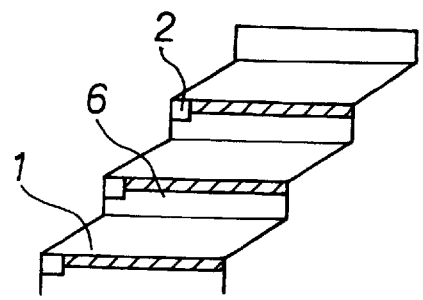
FIG. 12 is an explanatory drawing of the light transmission tube used on a staircase.

The line glower according to the present invention can be used on a staircase. The light transmission tube 1 is installed on the top of each riser 6 of the staircase as shown in FIG. 12. The illumination of the light transmission tube 1 will permit to effectively prevent one from missing his or her foot on the stairs. The line glower installed on an emergency staircase will assure one to know the stairs at an emergency at night, thus providing a safe and positive guidance for evacuation.

Figure 13:
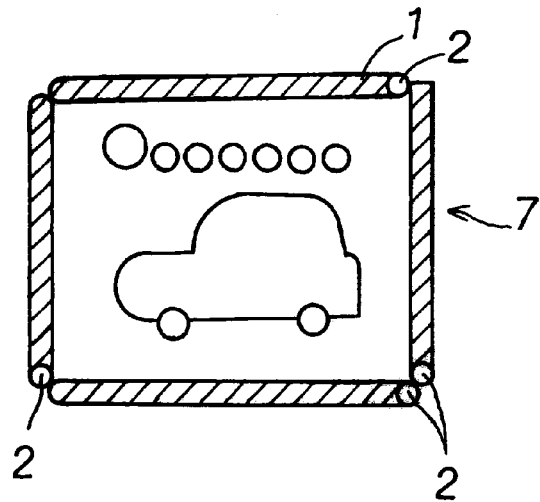
FIG. 13 is an explanatory drawing of the light transmission tube used on a signboard.
Figure 14:
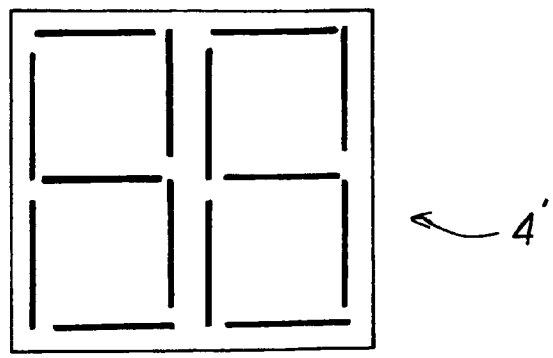
FIG. 14 is an explanatory drawing of an indicator panel in which the light transmission tube is used in a segmented form.

FIG. 13 shows the light transmission tube 1 used along the profile of a signboard or trade sign, FIG. 14 shows segments of the light transmission tube 1 used as indication segments of an indicator panel 4' provided along a highway, showing an allowed maximum speed. Seven segments of the light transmission tube 1 are used for each digit to provide a numerical indication, and they are adapted to turn on and off to form a number as the limited speed is changed. With an increased number of such segments, it is possible to provide a variable character indication.

Figure 15:
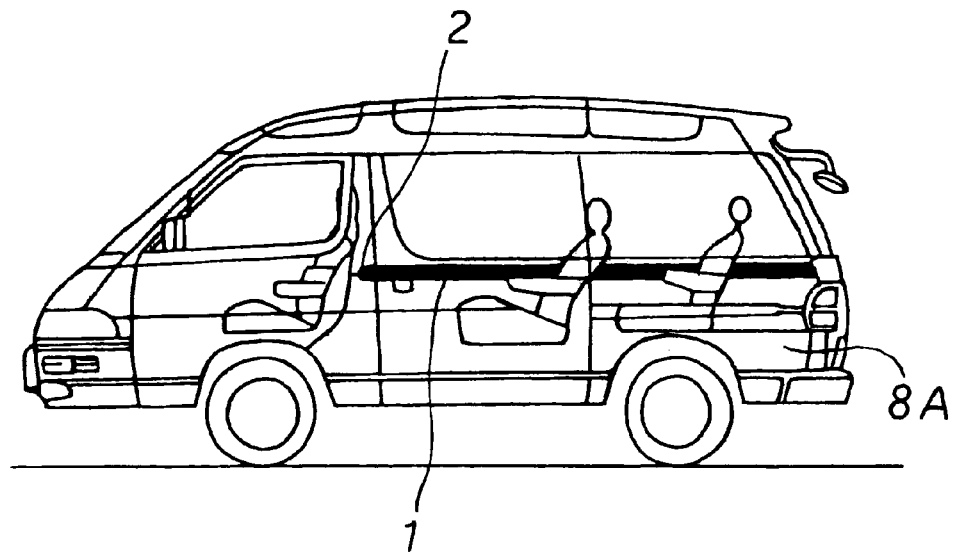
FIG. 15 is an explanatory drawing of the light transmission tube used as an indirect illumination inside a car.
Figure 16:
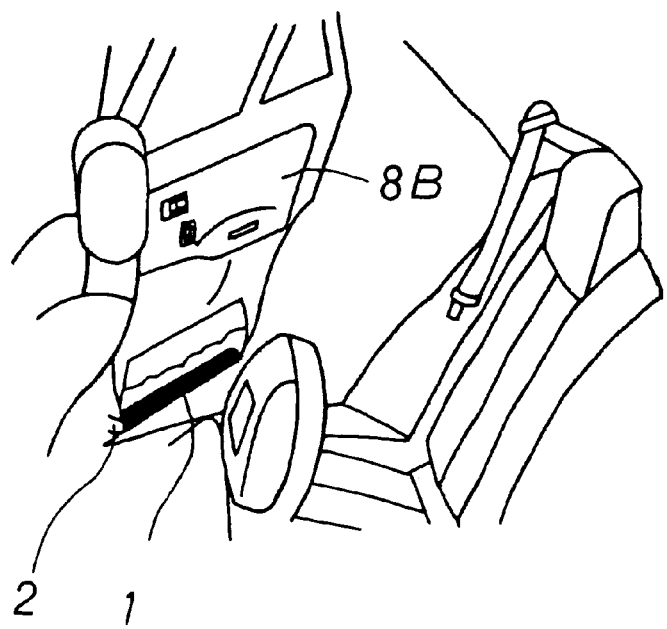
FIG. 16 is an explanatory drawing of the light transmission tube used as a foot light on the lower portion of a car door.
Figure 17:
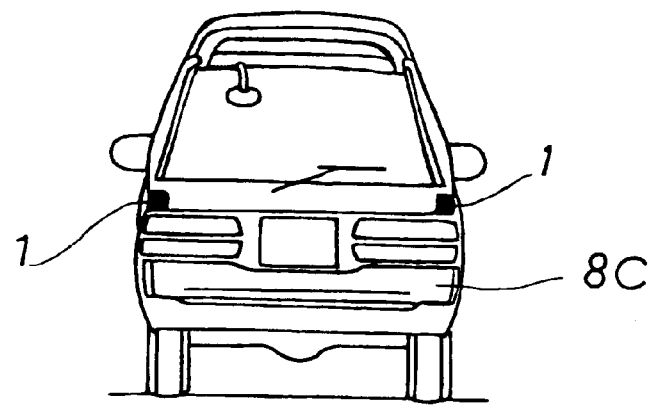
FIG. 17 is an explanatory drawing of the light transmission tube used as a side marker lamp on the lateral side of a car.
Figure 18:
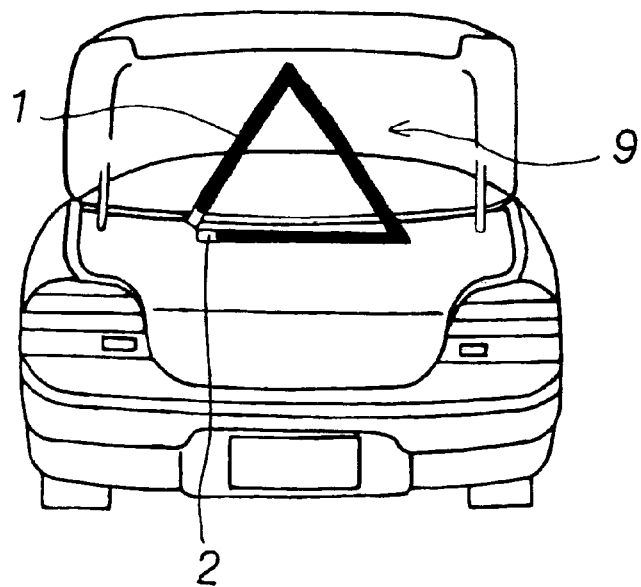
FIG. 18 is an explanatory drawing of the light transmission tube used as a stop sign on the rear side of a car trunk lid.

FIG. 15 shows the light transmission tube 1 installed on the inner lateral side of a car 8A to provide an indirect illumination. FIG. 16 shows the light transmission tube 1 provided as a foot light on the lower portion of a car door 8B. Also FIG. 17 shows the light transmission tubes 1 used as side marker lamps on the rear ends 8C of a car. The light transmission tube 1 is used along the profile of a triangular stop sign 9 on the rear side of a trunk lid of a car stopping on the road to signal to another approaching car.

In addition to the above applications, the line glower of the present invention can be used as follows:

(1) Illuminated nameplate (2) Illuminated area marker or area bar for use during nighttime work (3) Illuminated walking stick (4) Illuminated sword (for sports and toy)

(5) Illumination of tent guy rope (to prevent stumbling, falling down)

(6) Illumination of water bath or the like (7) Lane markers or decoration of swimming pool (8) Illumination of buoy, pier, levee and marine hose for improved visibility (9) Railroad crossing barrier

(10) Safety indications such as tunnel height marker, entrance height marker, etc.

As having been described in the foregoing, the line glower according to the present invention comprises a light transmission tube including a transparent core and a clad having a smaller refractive index than the core, a water-proof light source disposed at at least one axial end of the light transmission tube, and a drive unit to turn on and off the light source, the light emitted from the light source and incident upon an end of the light transmission tube being let to go out from a lateral side of the tube. The light source is waterproofed and connected integrally with the light transmission tube so that the light source may be disposed outdoors or in water separately from the drive unit. Therefore, the main body of the line glower can be used without any problem in water, rain, snow or in a place where an explosion may possibly take place. The line glower according to the present invention can provide an ample illumination from the lateral side thereof even with a small power, and its compact design permits to place the line glower in a limited space.

What is claimed is:

1. A line glower, comprising:

a light transmission tube including a transparent core and a clad having a smaller refractive index than the core;

a light source disposed at at least one axial end of the light transmission tube; and a drive unit to turn on and off the light source, the light produced by the light source and incident upon an end of the light transmission tube being emitted from a lateral side of the light transmission tube.

2. The line glower according to claim 1, wherein the light transmission tube further includes a band-shaped light reflective layer disposed between the clad and core along the length of the clad.

3. The line glower according to claim 2, wherein a light-reflecting protective layer is disposed on the outer surface of the clad positioned to cover the light reflective layer.

4. The line glower according to claim 1, wherein the drive unit is provided with a battery source including at least one of a solar battery and a storage battery.

5. The line glower according to claim 1, wherein the light transmission tube forms segment figures in an indicator board.

6. The line glower according to claim 1, wherein the light transmission tube forms a part of a traffic control sign.

7. The line glower according to claim 1, wherein the light transmission tube is installed at least one of inside and outside a car body.

8. The line glower according to claim 1, wherein the light transmission tube forms a part of an evacuation guide light used in a passageway of an occupied structure, including an office building, picture theater and a public hall.

9. The line glower according to claim 1, wherein the light transmission tube is installed on an upper edge of a staircase riser.

\* \* \* \* \*